3,100,749
LUBRICATING COMPOSITIONS
Eugene Wittner, Florissant, Mo., and Irving Rozalsky, East Alton, Ill., assignors to Shell Oil Company, New York, N.Y., a corporation of Delaware
No Drawing. Filed May 16, 1960, Ser. No. 29,127
8 Claims. (Cl. 252—49.9)

This invention relates to improved hydrocarbon lubricants, and particularly to mineral lubricating oil compositions which possess good detergency and corrosion or rust inhibiting properties.

It is known that certain high molecular weight non-ash forming copolymers of vinylpyridine and other polymerizable compounds such as acrylate esters, e.g. copolymer of a vinylpyridine and a $C_{14-18}$ alkyl methacrylate, function as detergents when added in small amounts to lubricants such as mineral lubricating oils. However, copolymers of this type have been found to be corrosive and under severe conditions of use such as under extreme temperatures and pressure they have been found to be shear unstable resulting in sludging and other undesirable side effects.

It has now been discovered that excellent detergent and corrosion inhibiting lubricating oil compositions can be made by dispersing in lubricating oils such as mineral lubricating oils, two dissimilar copolymers comprising (A) a copolymer of a vinylpyridine and a $C_{10-20}$ alkyl methacrylate having a molecular weight range of from 50,000 to 300,000, preferably between 100,000 to 200,000, and a nitrogen content of from 2.5% to 3.5% and (B) a copolymer of (1) a vinylpyridine and (2) a mixture of at least two dissimilar esters of an acrylic acid and two different aliphatic alcohols one of which is a $C_{10-20}$ alkanol and the other alcohol is a $C_{1-4}$ alkanol, the acrylate of the $C_{1-4}$ alkanol making up not more than 60% of the mixture (B) and the molecular weight of the copolymer (B) being in the range of from 400,000 to 800,000, preferably between 500,000 and 650,000 and having a nitrogen content of from 0.3% to 1%. The two copolymers (A) and (B) should be present in definite proportions in which the copolymer (B) is in a predominant amount. Preferably the copolymer (A) should be present in an amount of from 10% to 25% and the copolymer (B) should be present in an amount of from 90% to 75% of the total polymer mixture. The two copolymers (A) and (B) totally are present in the mineral oil in amounts ranging from about 2% to about 10%, preferably from about 4% to about 6% by weight.

The vinylpyridines used in making the copolymers (A) or (B) may be exemplified by 2-vinylpyridine, 3-vinylpyridine, 4-vinylpyridine, 2-methyl-5-vinylpyridine, 4-methyl-2-vinylpyridine, 5-ethyl-2-vinylpyridine and 2-butyl-5-vinylpyridine, and the like. Particularly preferred groups comprise 2-, 3-, 4-vinylpyridines and the lower alkyl-substituted derivatives thereof.

The long chain acrylate esters used in the preparation of the copolymer (A) or (B) include the esters of acrylic acids and long chain aliphatic alcohols. Examples of the acrylic acids include acrylic acid and the alpha-substituted acrylic acids such as methacrylic acid, ethacrylic acid, alpha-phenyl acrylic acid, alpha-cyclohexyl acrylic acid and chloroacrylic acid. The long chain aliphatic alcohols used in the esterification of these acids may be exemplified by decyl, lauryl, cetyl, stearyl, eicosanyl, nonadecanyl, and the like alcohols and mixtures thereof. Particularly preferred esters to be used are the acrylic acid and methacrylic acid esters of aliphatic monohydric alcohols, and especially alkyl alcohols, containing from 14 to 20 carbon atoms.

Specific examples of these long chain acrylic acid esters used in the preparation of copolymer (A) include, among others, decyl acrylate, lauryl acrylate, stearyl acrylate, decyl methacrylate lauryl, methacrylate, cetyl methacrylate, stearyl methacrylate, eicosanyl acrylate, docosanyl acrylate and the like, and mixtures thereof.

In preparing copolymers of type (A) which have a high nitrogen content (2.5–3.5%) and a relatively low molecular weight, the amount of the vinylpyridine to the acrylate ester used at the start of the reaction should be about 20–30% vinylpyridine and 80–70% acrylate ester.

In preparing copolymers of type (B) which have a low nitrogen content (0.3–1%) and a high molecular weight, the ratio of vinylpyridine to the acrylate ester mixture should be about 2–10% vinylpyridine to 98–90% acrylate ester mixture. In the acrylate ester mixture where an ester of an acrylic acid and a $C_{1-4}$ alkanol is one component and the other is a long chain acrylate of a $C_{14-20}$ alkanol, a mixture of long chain acrylates can be used. Preferably two or more of these long chain acrylate esters is used in making the new copolymers. Illustrative examples of these esters and mixtures thereof include, among others, dodecyl methacrylate, octadecyl methacrylate, tetradecyl acrylate, octadecyl methacrylate; decylmethacrylate/octadecyl methacrylate; tetradecyl methacrylate/hexadecyl methacrylate; tetradecyl acrylate/octadecyl methacrylate; dodecyl methacrylate/eisonsanyl acrylate, and the like.

When mixtures of higher acrylate esters are used, it is highly desirable to have a substantial difference in the number of carbon atoms of the alcohol portion. Particularly superior results are obtained when one of the acrylate esters is a $C_{10}$ to $C_{14}$ acrylate ester and the other is a $C_{16}$ to $C_{20}$ acrylate ester.

In the mixtures, the different long chain acrylate esters are employed in mol ratios from 1:4 to 4:1. The superior copolymers are obtained when the higher ester, e.g., those having from 10 to 20 carbon atoms in the alcohol portion, and the lower esters, e.g. those having from 10 to 14 carbon atoms in the alcohol portion are combined in a mol ratio varying from 1:1 to 1:3.

The other type of component used in making the (B) copolymers is an ester of an acrylic acid and a lower aliphatic alcohol of not more than 4 carbon atoms. Examples of these lower acrylates include, among others, the acrylic acid and methacrylic acid esters of methanol, ethanol, butanol, hexanol, isobutyl alcohol and propanol.

This other type of component is used only in certain specific amounts. It has been found that the ester of the acrylic acids and the aliphatic alcohol containing not more than 6 carbon atoms should be employed in less than 60 mol percent of the total of the acrylate esters. Preferably the lower acrylate ester is employed in amounts varying from 10% to 30% by weight of the total of the acrylate esters.

The copolymers of (A) and (B) are prepared essentially in the same manner, particularly with respect to catalyst, temperature and polymerization method. Thus, any suitable conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, and nature and amount of the monomers. When the polymerization is accomplished in solution, the molecular weight of the product will be lower when the dilution is greater, i.e., when the concentration of solvent is greater. With the same catalyst, the higher polymerization temperature tends to give lower molecular weights.

Polymerization initiators that are particularly suited for use in preparing the claimed copolymers include various free-radicals yielding catalysts as peroxide catalysts, such as, for example, benzoyl peroxide, lauroyl peroxide, tertiary butyl hydroperoxide, 2,2-bis(tertiary butyl peroxy) butane, di(tertiary butyl) peroxide, tertiary butyl perlargonate, hydrogen peroxide, sodium or potassium persulfate, percarbonate, peracetic acid and the like. Other suitable catalysts include sodium bisulfite, diethyl sulfoxide, azo compounds, such as alpha, alpha-aodiisobutylonitrile and the like. The amount of the initiator added may vary over a considerable range. In general, the amount of initiator added will vary from 0.1% to 5% by weight of the material being polymerized. Preferred amounts vary from 0.1% to 2% by weight.

The temperature selected is important relative to the viscosity temperature (VT) properties desired in copolymers of the (B) type. For a given lower acrylate content, the higher temperatures give lower VT values. Preferred temperatures range from 40° C. to 160° C. As shown in Examples I and II temperatures of around 120° C. are preferred but temperatures of even up to 160° C. may be used.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressure may be employed.

At the end of the polymerization, any unreacted monomer or monomers and/or solvents may be removed, preferably by distillation or by precipitation with appropriate solvents.

The following examples illustrate the preparation of suitable polymers for use in oil compositions in accordance with the invention. Unless otherwise specified, parts disclosed in the examples are parts by weight.

In the examples, the molecular weights were determined by light scattering method described in Chem. Rev., vol 40, p. 319 (1948), and the ratio of vinylpyridines to alkyl ester was determined by analysis for nitrogen.

EXAMPLE I.—COPOLYMER A TYPE

A mixture of 25% of 2-methyl-5-vinylpyridine and 75% stearyl methacrylate were heated in a 50–50 mixture of benzene and a light mineral oil (East Texas 100 neutral) to about 120° C. at which time 0.25% wt. of ditert.butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II.—COPOLYMER B TYPE

A mixture of 30% stearly methacrylate, 51% lauryl methacrylate, 14% methyl methacrylate and 5.0% 2-methyl-5-vinylpyridine was charged to a 300-gallon stainless steel autoclave. A 50–50 mixture of benzene and neutral petroleum oil was then added to the autoclave so as to furnish 1 part of the mixture per 3 parts of the total monomer. Di-tertbutyl peroxide (0.25%) was then added and the mixture heated at 120° C. for about seven hours.

At the completion of the reaction, the benzene was stripped off to final conditions of 120° C. and 10 mm. Hg with nitrogen sparging. The benzene-free product was then diluted with neutral oil to a polymer content of about 30% by weight and filtered at 100–120° C. The polymer had a molecular weight of about 600,000 and a nitrogen content of 0.54%.

Other examples of copolymers (A) and (B) include:

Copolymers A (1) Lauryl methacrylate/2-methyl-5-vinylpyridine, M.W. =100,000, percent N=3.05.
(2) Lauryl methacrylate/5-ethyl-2-vinylpyridine, M.W. =150,000, percent N=3%.
(3) Stearyl methacrylate/2-vinylpyridine, M.W. =200,000, percent N=2.8.
(4) Stearyl methacrylate/2-butyl-5-vinylpyridine, M.W. =150,000, percent N=2.5.
(5) Lauryl methacrylate/4-methyl-2-vinylpyridine, M.W. =150,000, percent N=2.9.

Copolymer B (1) Lauryl methacrylate/methyl methacrylate/2-methyl-5-vinylpyridine, M.W.=650,000, percent N=0.5.
(2) Lauryl methacrylate/stearyl methacrylate/methyl methacrylate, M.W.=800,000, percent N=0.6.
(3) Lauryl methacrylate/stearyl methacrylate/butyl methacrylate, M.W.=750,000, percent N=0.5.
(4) Lauryl methacrylate/stearyl methacrylate/methyl methacrylate/5-ethyl-2-vinyl-vinylpyridine, M.W. =600,000, percent N=0.8.
(5) Lauryl methacrylate//stearyl methacrylate/methyl methacrylate/4-vinylpyridine, M.W.=600,000, percent N=0.8.

Although the detergency and corrosion inhibition of various lubricants such as mineral oils are greatly improved by addition thereof of two dissimilar vinylpyridine copolymers of groups (A) and (B), the oxidative stability and wear inhibition of such compositions is greatly enhanced and the overall properties of such compositions substantially improved by addition thereto of small amounts (0.01–5% by weight, preferably 0.1–2% by weight) of a bisphenolic anti-oxidant and/or certain oil-soluble phosphorus compounds. The bisphenols and preferably alkyl bisphenols include 1,1-bis(2-hydroxy-3-t-butyl-5-methylphenyl)methane; bis(2-hydroxy-3-t-butyl-5-methylphenyl)ethane; 1,1-bis(2-hydroxy-3-t-butyl-5-methyl-phenyl)propane; bis(2-hydroxy-3-t-butyl-5-methylphenyl)butane; bis(2-hydroxy-3-t-butyl-5-methylphenyl)isobutane; 1,1 - bis(6 - hydroxy - 5 - t - butyl - 3 - methxylphenyl)methane; bis(2-hydroxy - 5 - t - butyl - 3 - methylphenyl)ethane; 1,1 - bis(2 - hydroxy - 5 - t - butyl - 3 - methylphenyl)propane; 1,1 - bis(2 - hydroxy - 5 - t-amyl - 3 - methylphenyl)butane; 1,1 - bis(2 - hydroxy - 5 - t - amyl - 3 - methylphenyl)isobutane; etc. The 2,4,6-trialkyl phenols containing two tertiary alkyl groups in the 2,4- and 2,6-positions are preferred, such as 2,4-ditert - butyl - 6 - methyl -, 2,6 - ditert - butyl - 4 - methylphenol or 2,6-ditert-butyl-4-methylolphenol and 4,4'-methylene bis(2,6-dibutylphenol).

The phosphorus compounds include alkyl, cycloalkyl, alkaryl, aralkyl, and aryl phosphites, phosphates, phosphonates, and their thio-derivatives, such as $C_{3-18}$ alkyl phosphites, e.g., di and tributyl, octyl, lauryl, stearyl, cyclohexyl, benzyl, cresyl, phenyl phosphites or phosphates, as well as their thio-derivatives; $P_2S_5$-terpene reaction product, $P_2S_5$-pine oil reaction product and metal salts thereof such as sodium, potassium, calcium, or barium salts of $P_2S_5$-terpene reaction product; dibutyl methanephosphonate, dibutyl trichloromethanephosphonate, dibutyl monochloromethanephosphonate, dibutyl chlorobenzenephosphonate, dibutyl monochloromethanephosphonate, dibutyl chlorobenzenephosphonate, and the like. The esters of pentavalent phosphorus acids such as phenyl, dicresyl, triphenyl, tricresyl, trilauryl and tristearyl ortho phosphonates, $P_2S_5$-terpene reaction products and mixtures thereof are preferred.

The combination of the pyridine-containing copolymer mixtures, with or without the added presence of bisphenols and/or certain phosphorus compounds, as defined, imparts properties to hydrocarbons of the lubricating oil range which make them highly effective in ensuring engine cleanliness, essentially no corrosion and very low wear when they are used for the lubrication of internal combustion engines, and particularly spark ignition engines which are operated on fuels which contain metal-containing substances, such as organometallic anti-knock agents, and the like. This co-action is obtained in various hydrocarbon lubricating oils, whether of natural origin or synthetic, especially oils which are substantially paraffinic and/or naphthenic; they may contain substantial proportions of hydrocarbons having aromatic character but the amounts and types of components should be such that the Dean and Davis (Chem. and Met. Eng., vol. 36, 1929, pp. 618–619) viscosity index of the base oil is at least 80, preferably at least 90 to 150.

The oil may be derived from a highly paraffinic crude, in which case distillation and/or dewaxing may be sufficient to provide a suitable base stock; a minimum of chemical or selective solvent treatment may be used if desired. Mixed base crudes and even highly aromatic crudes which contain paraffinic hydrocarbons also provide suitable oil base stocks by well known refining techniques. Usually these comprise the separation of dstillate fractions of suitable boiling range followed by selective solvent extraction with solvents such as furfural, phenol and the like to provide raffinate fractions which are suitable for further refining by dewaxing and chemical treatment such as sulfuric acid treatment, etc. Thus, it may be a refined hydrocarbon oil obtained from a paraffinic, naphthenic, asphaltic or mixed base crude, and/or mixtures thereof, such as SAE 5W, 10W, 20W, 20, 30, 40, 50 mineral oils. The hydrocarbon oils may be blends of different mineral oil distillates and bright stock; they may have blended therewith in minor but compatible proportions fixed oils, such as castor oil, lard oil and the like and/or with synthetic lubricants, such as polymerized olefins, e.g., polyisobutylene.

The above mixture of low and high nitrogen-containing copolymers, with or without the added presence of bisphenol and/or an organic phosphorus compound as defined, when added to a hydrocarbon lubricating oil exhibits a beneficial influence by imparting to the oil or coacting with it so that the final composition has improved oxidation stability, detergency, corrosion inhibiting and wear-inhibiting properties. Hydrocarbon oils thus improved can be natural or synthetic oils having lubricating properties.

The following non-ash forming compositions are representative of the invention.

Composition A: Percent weight
  Example I copolymer (25%), Example II copolymer (75%) _____ 5.5
  4,4′-methylene bis(2,6-ditertbutyl phenol) ____ 0.5
  Tricresyl phosphate_____ 0.8
  Bright stock_____ 6
  Mineral lubricating oil (10W-30) _____ Balance
Composition B:
  Example I copolymer (25%), Example II copolymer (75%) _____ 5.5
  4,4′-methylene bis(2,6-ditertbutylphenol) _____ 0.5
  Tricresyl phosphate_____ 0.8
  Dicresyl phosphate_____ 0.08
  Bright stock_____ 6
  Mineral lubricating oil (10W-30) _____ Balance
Composition C:
  Example I copolymer (10%), Example II copolymer (90%) _____ 5
  Mineral lubricating oil (SAE 30) _____ Balance
Composition D:
  Example I copolymer (20%), Example II copolymer (80%) _____ 5
  4,4′-methylene bis(2,6-ditertbutylphenol) _____ 0.5
  Mineral lubricating oil (100 grade visc., aviation grade) _____ Balance
Composition E:
  Copolymer $A_2$ (25%), Copolymer $B_2$ (75%)_ 5
  Tricresyl phosphate_____ 0.5
  4,4′-methylene bis(3,5-ditertbutylphenol) ____ 0.5
  Mineral lubricating oil_____ Balance In order to demonstrate the utility and improved properties of lubricating compositions of the present invention the compositions identified in Table I were tested in the General Motors MS Phase 2 Test (increased exhaust back pressure) described in AMA Proposed Test Procedure Minutes for Motor Oils for ASTM Test Procedure, Boston Meeting, August 1958, using a Cadillac engine and in the Navy Turbine Oil Rust Test (TORT) and the results were as follows:

TABLE I

| Composition | General Motors test | | Shaving cream in lifter gallery | TORT, percent rust on steel |
|---|---|---|---|---|
| | Avg. lifters rust rating (10=perfect) | Overall rust rating | | |
| A_____ | 8.1 | 7.3 | None_____ | 20 |
| B_____ | 8.0 | 6.8 | ____do____ | 20 |
| Mineral oil¹ + 5% Example I copolymer. | 5.4 | | Copious___ | 50 |
| Mineral oil¹ + 5% Example II copolymer. | 5.8 | 5.4 | Moderate_ | 40 |
| Mineral oil¹_____ | 5 | 5 | Copious___ | 60 |

¹ Mineral oil—SAE 30.

Lubricating compositions of this invention are particularly applicable for high temperature, high speed use as in aviation engines, automotive engines and truck engines, as well as industrial equipment operating under the conditions described in this invention.

We claim as our invention:

1. An improved corrosion resistant and detergent hydrocarbon lubricating oil composition comprising a major amount of hydrocarbon lubricating oil and from 2% to 10% by weight total of a copolymer mixture of (A) and (B) of which copolymer (A) comprises 10–25% by weight and copolymer (B) comprises 90–75% by weight of the total polymer mixture and copolymer (A) is a copolymer of a mixture of 20–30% by weight of a vinylpyridine and 80–70% by weight of a $C_{10-20}$ alkyl methacrylate having a molecular weight of 50,000 to 300,000 and a nitrogen content of from 2.5% to 3.5% and (B) is a copolymer of a vinylpyridine and a mixture of two dissimilar acrylates one being a $C_{10-20}$ alkyl methacrylate and the other being a $C_{1-4}$ alkyl methacrylate which constitutes 10–30% by weight of the total acrylate mixture, the copolymer having a molecular weight of from 400,000 to 800,000 and a nitrogen content of from 0.3 to 1%.

2. The lubricant composition of claim 1 wherein in the copolymer B the $C_{10-20}$ alkyl acrylate is a mixture of $C_{10-14}$ alkyl methacrylate and $C_{16-20}$ alkyl methacrylate and the $C_{1-4}$ alkyl methacrylate constituting 10–30% by weight of the total methacrylate mixture.

3. An improved corrosion resistant and detergent mineral lubricating oil composition comprising a major amount of mineral lubricating oil and from about 2% to about 10% by weight total of a copolymer mixture of (A) and (B) of which copolymer (A) comprises 10–25% by weight and copolymer (B) comprises 90–75% by weight of the total polymer mixture and copolymer (A) is a copolymer of 20–30% by weight of 2-methyl-5-vinylpyridine and 70–80% by weight of stearyl methacrylate having a molecular weight of 100,000–200,000 and a nitrogen content of 2.5–3.5% and copolymer (B) is a copolymer of 2–10% by weight of 2-methyl-5-vinylpyridine and a mixture of lauryl methacrylate, stearyl methacrylate and methyl methacrylate, the methyl methacrylate constituting 10–30% by weight of the total methacrylate mixture, the copolymer having a molecular weight of 500,000–650,000 and a nitrogen content of 0.3–1%.

4. The lubricant composition of claim 3 containing from about 0.01% to about 5% by weight of 4,4′-methyl bis(2,6-ditertbutyl phenol).

5. The lubricant composition of claim 3 containing from about .01% to about 2%, of tricresyl phosphate.

6. The lubricant composition of claim 3 containing from about 0.1% to about 2% by weight of 4,4'-methyl bis(2,6-ditertbutyl phenol) and tricresyl phosphate.

7. An improved corrosion resistant and detergent mineral lubricating oil composition comprising a major amount of mineral lubricating oil and from about 2% to about 10% by weight total of a copolymer mixture of (A) and (B) of which copolymer (A) comprises 10-25% by weight and copolymer (B) comprises 90-75% by weight of the total polymer mixture and copolymer (A) is a copolymer of 20-30% by weight of 2-methyl-5-vinylpyridine and 70-80% by weight of stearyl methacrylate having a molecular weight of 100,000-200,000 and a nitrogen content of 2.5-3.5% and copolymer (B) is a copolymer of 2-10% by weight of 2-methyl-5-vinylpyridine and a mixture of lauryl methacrylate, stearyl methacrylate and methyl methacrylate, the methyl methacrylate constituting 10-30% by weight of the total methacrylate mixture, the copolymer having a molecular weight of 500,000-650,000 and a nitrogen content of 0.3-1% and from about 0.1% to 2% by weight each of tricresyl phosphate and 4,4'-methylene bis(2,6-ditertbutylphenol).

8. The lubricant composition of claim 7 containing from about 0.1% to about 2% by weight of dicresyl phosphate.

References Cited in the file of this patent
UNITED STATES PATENTS

| | | |
|---|---|---|
| 2,737,496 | Catlin | Mar. 6, 1956 |
| 2,862,976 | Dubbs et al. | Dec. 2, 1958 |
| 2,889,282 | Lorensen et al. | June 2, 1959 |
| 2,944,086 | Coffield et al. | July 5, 1960 |
| 2,957,854 | Lorensen et al. | Oct. 25, 1960 |